Patented June 24, 1930

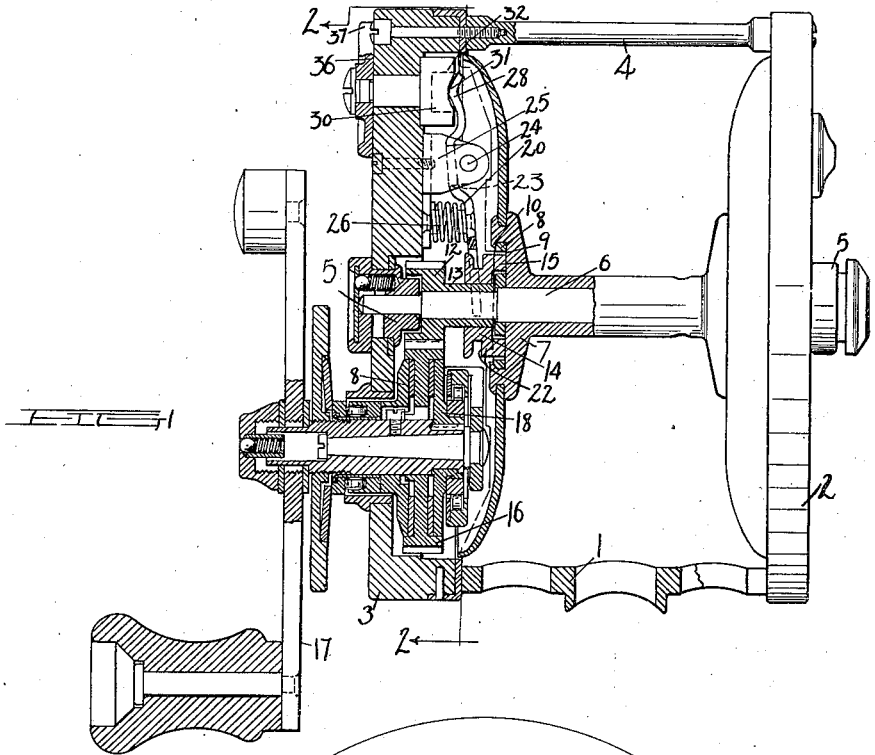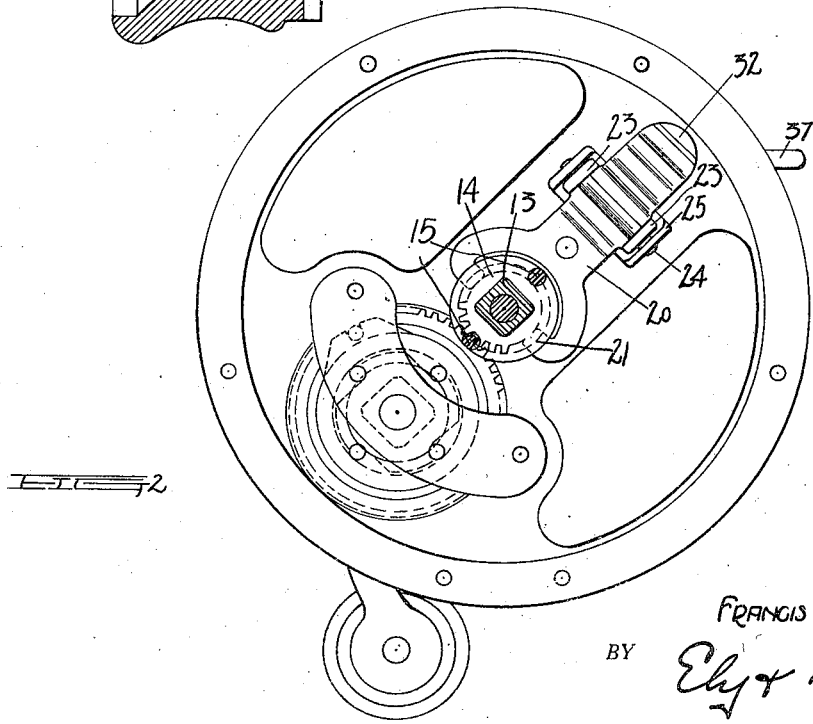

1,765,903

UNITED STATES PATENT OFFICE

FRANCIS M. CASE, OF CLEVELAND, OHIO, ASSIGNOR TO THE ENTERPRISE MANUFACTURING COMPANY, OF AKRON, OHIO, A CORPORATION OF OHIO

SALT-WATER REEL

Original application filed March 25, 1922, Serial No. 546,637. Divided and this application filed July 22, 1927. Serial No. 207,682.

This invention relates to fishing reels and particularly to reels of the type used in salt water.

The object of the present invention is to improve upon the mechanism incorporated in the front plate or gear housing by which the reel may be converted into a free spool reel by disconnecting the spool from the driving gears. Reels of this type have been known heretofore, the purpose and advantage of the present invention being in simplicity and economy of manufacture and positiveness of operation.

Various other features of construction are shown in the drawings and described herein, as is necessary to the understanding of the present invention which is directed to the free spool mechanism alone. The present application is in the nature of a division of my prior application which has since matured into Patent No. 1,554,786, dated September 22, 1925.

In the drawings accompanying this application, the preferred form of the device is shown, although changes and modifications may be made therein without departure from the invention as set forth in the claims.

In the drawings:

Figure 1 is a side elevation and section of a reel structure having embodied therein the free spool mechanism forming the subject of this application; and Figure 2 is a section on the line 2—2 of Figure 1.

The fishing reel comprises the usual frame-work including a foot plate 1, adapted for attachment to the fishing rod, and end plates 2 and 3, constituting a spool housing, the former being the back plate and the latter the front plate, which serves as the gear housing. The plates are connected by posts 4 and serve as supports for bearings 5 for the spool shaft 6 upon which the spool 7 is mounted. In the end of the spool adjacent the front plate is fixed a clutch disk 8 having a plurality of holes 9 therein, the disk being seated in a recess in the end of the spool and secured in position by spinning the metal of the spool about the disk as shown at 10.

On the shaft 6 adjacent the spool is carried a driven pinion 12 having an elongated non-circular or squared shank 13 upon which is slidably mounted the movable clutch 14 having pins 15 adapted to enter the holes 9 in the clutch disk and afford a driving connection for the spool. The pins 15 are formed as integral parts of the clutch member. This makes a stronger and more compact construction of the clutch member, avoiding the riveting of pins to either the clutch member or the spool. The pinion 12 is driven by engagement with a driving gear 16 operated by a hand crank 17 through friction drive 18, the degree of friction exerted upon the gear being adjusted in a manner such as shown and described in the patent of which this is a division and to which reference may be made for a further description.

The clutch 14 is movable into and out of driving engagement with the spool by means of a lever 20 having a yoke with fingers 21 thereon which engage in opposite sides of a groove 22 formed on the clutch member. The lever is pivoted by lugs 23 upon a pin 24 located in a bracket 25 carried on the front plate and is urged to move the clutch into operative position by means of a coil spring 26 mounted in the back plate and bearing against the under side of the lever.

The tail end of the lever is formed with a broad, angular bent portion 28 which rests upon the upper surface of a rotary cam member or button 30 having a transverse groove 31 and lateral flat portions or lands 32. The cam button is pivotally mounted in the front plate and is connected to a button 36 operated by means of a lever or operating handle 37 extending alongside the front plate and projecting over the margin.

It will be noted that when the clutch is in engaged position as shown in Figure 1, the angular extension rests in the transverse groove whereby the clutch is maintained in engagement with the spool. When the button is turned through an angle of 90°, the broad tail of the lever rests upon the two lands or flat portions on the top of the spool and the clutch member is withdrawn and will remain withdrawn, not being subject to accidental movement. In former reel constructions of this type where a cam-operated pivoted lever has been employed, the pressure of the spring against the cam has induced a tendency for the cam to rotate. This is not true in the present construction where the spring pressure in either adjustment tends to retain the cam in either its on or off position. The free spool mechanism is, therefore, more positive in its action than similar forms of the prior art.

Another valuable feature of the device is the arrangement of the shiftable clutch which makes it unnecessary to move the driven pinion bodily as in certain prior art constructions.

What is claimed is:

1. In a fishing reel of the free spool type, a reel housing, a shaft in the reel housing, a spool mounted upon the shaft, a clutch member attached to one end of the spool, a driven pinion on the shaft, a non-circular shank on the pinion, a mating clutch member slidable on the shank, and means to shift the last named clutch member toward and from the spool, comprising a lever pivoted on the reel housing, one end of the lever engaging the said clutch member and the other end of the lever being provided with an extension, a rotatable cam button having a transverse slot and flat surfaces thereon on which the lever extension may bear selectively and a spring bearing against the lever and operating to hold its extension in contact with the cam button.

2. In a fishing reel of the free spool type, a reel housing, a shaft in the reel housing, a spool mounted upon the shaft, a clutch member attached to one end of the spool, a driven pinion on the shaft, a non-circular shank on the pinion, a mating clutch member slidable on the shank, and means to shift the last named clutch member toward and from the spool, comprising a pivoted lever on the reel housing and a movable cam against which one end of the lever bears, the other end of the lever engaging the said movable clutch member.

3. In a fishing reel of the free spool type, a reel housing, a shaft in the reel housing, a spool mounted upon the shaft, a clutch member attached to one end of the spool, a driven pinion on the shaft, a mating clutch member connected with the pinion, and means to move the mating clutch member into engagement with the other clutch member, comprising a pivoted lever on the reel housing, one end of the lever being connected to the said clutch member, the other end of the lever having an extension, a rotatable cam button having a transverse slot and flat surfaces thereon on which the lever extension may bear selectively and a spring bearing against the lever and operating to hold its extension in contact with the cam button.

4. In a free spool reel, the combination of a reel housing, a shaft in the housing, a spool mounted on the shaft, a disk secured upon the spool, the disk being provided with recesses, a clutch member movable toward and from the spool, the clutch member being formed with integral pins adapted to enter the holes in the disk, means for shifting the clutch member toward and from the disk, and means for rotating the clutch member, comprising a pinion and a shank upon the pinion, the clutch member having a sliding, non-rotating engagement with the shank.

FRANCIS M. CASE.